United States Patent
Touitou et al.

(10) Patent No.: US 10,484,481 B2
(45) Date of Patent: Nov. 19, 2019

(54) FAULT TOLERANT, CONTENT DOWNLOAD SYSTEM

(71) Applicant: HUAWEI TECHNOLOGIES CO., LTD., Shenzhen, Guangdong (CN)

(72) Inventors: Dan Touitou, Munich (DE); Eran Gampel, Munich (DE); Adi Molkho, Munich (DE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 137 days.

(21) Appl. No.: 15/644,066

(22) Filed: Jul. 7, 2017

(65) Prior Publication Data

US 2017/0310764 A1  Oct. 26, 2017

Related U.S. Application Data

(63) Continuation of application No. PCT/EP2015/050200, filed on Jan. 8, 2015.

(51) Int. Cl.
*H04L 29/08* (2006.01)
*H04L 29/14* (2006.01)
*H04L 12/26* (2006.01)
*H04L 12/06* (2006.01)
*H04L 29/06* (2006.01)

(52) U.S. Cl.
CPC ............ *H04L 67/148* (2013.01); *H04L 43/10* (2013.01); *H04L 67/06* (2013.01); *H04L 69/40* (2013.01); *H04L 67/42* (2013.01); *H04L 69/163* (2013.01)

(58) Field of Classification Search
USPC ........ 709/222, 220, 221, 223, 224, 231, 232
See application file for complete search history.

(56) References Cited

U.S. PATENT DOCUMENTS

| | | | |
|---|---|---|---|
| 6,473,192 B1 * | 10/2002 | Kidani | G06F 3/121 358/1.14 |
| 6,772,193 B1 * | 8/2004 | Igawa | G06F 16/9574 709/203 |
| 6,910,078 B1 | 6/2005 | Raman et al. | |

(Continued)

FOREIGN PATENT DOCUMENTS

| CN | 102437933 A | 5/2012 |
|---|---|---|
| CN | 103473191 A | 12/2013 |

(Continued)

OTHER PUBLICATIONS

International Search Report, dated Sep. 4, 2015, in International Application No. PCT/EP2015/050200 (5 pp.).

(Continued)

*Primary Examiner* — Jude Jean Gilles
(74) *Attorney, Agent, or Firm* — Kilpatrick Townsend & Stockton LLP

(57) ABSTRACT

A network device to mitigate interruptions in content downloading from a content server to a client device in a client-server network is disclosed. The device includes a recovery module (RM) to migrate a data transfer connection from a first server to a second server responsive to detection of an interruption in data transfer from the first server. The migrated data transfer connection may include an instruction associated with an amount of data transferred prior to the interruption in data transfer.

20 Claims, 5 Drawing Sheets

(56) References Cited

U.S. PATENT DOCUMENTS

| | | |
|---|---|---|
| 7,076,555 B1 | 7/2006 | Orman et al. |
| 7,941,510 B1* | 5/2011 | Tormasov ............ G06F 11/3006 709/220 |
| 9,250,771 B1* | 2/2016 | Decoret ................ G06F 3/0484 |
| 9,292,219 B2* | 3/2016 | Oiwa .................... G06F 3/0647 |
| 2006/0212636 A1* | 9/2006 | Yasuo ..................... G06F 1/263 710/303 |
| 2012/0072604 A1* | 3/2012 | Stephan ................ H04L 67/104 709/228 |
| 2013/0155902 A1 | 6/2013 | Feng et al. |
| 2014/0298333 A1* | 10/2014 | Yoshida ................ G06F 9/5088 718/1 |
| 2015/0046729 A1* | 2/2015 | Fukuoka ................ G06F 13/24 713/320 |
| 2015/0370659 A1* | 12/2015 | Pershin ................ G06F 11/203 714/4.11 |
| 2015/0370660 A1* | 12/2015 | Pershin ................ G06F 11/203 714/4.11 |
| 2015/0378830 A1* | 12/2015 | Hoobler, III .......... G06F 16/128 707/648 |
| 2017/0054817 A1* | 2/2017 | Wang .................... H04L 43/08 |
| 2017/0177649 A1* | 6/2017 | Badrinarayanan .... G06F 3/0617 |

FOREIGN PATENT DOCUMENTS

| | | |
|---|---|---|
| CN | 103731292 A | 4/2014 |
| CN | 104011687 A | 8/2014 |
| WO | 2012047654 A1 | 4/2012 |

OTHER PUBLICATIONS

Li, C. et al., *A TCP Service Migration Protocol for Single User multiple Devices*, Internet Engineering Task Force, Nov. 5, 2012, pp. 1-10.

Touitou, D. et al., *Accelerating NFV with Fast Path Offloading*, IEEE Consumer Communications and Networking Conference (CCNC 2014) Special Seesion: Network Function Virtualization, pp. 893-898.

*SockMi—SOCKet Migration System, Overview* (1 pg.).

Snoeren, A. et al. *The Migrate Internet Mobility Project*, M.I.T. Computer Science and Artificial Intelligence Laboratory, 32 Vassar Street, Cambridge, MA, 02139 USA (3 pp.).

Chinese Office Action dated Apr. 29, 2019 in corresponding Chinese Patent Application No. 201580064716.0 (14 pages).

* cited by examiner

FAULT TOLERANT, CONTENT DOWNLOAD SYSTEM

CROSS-REFERENCE TO RELATED APPLICATIONS

This application is a continuation of International Application No. PCT/EP2015/050200, filed on Jan. 8, 2015, the disclosure of which is hereby incorporated by reference in its entirety.

FIELD OF THE INVENTION

The present invention relates to content download systems generally and to fault tolerant, content download systems in particular.

BACKGROUND OF THE INVENTION

Much of the content downloaded from the Internet today includes video and/or audio content. This type of downloaded content is generally characterized by its being streaming content, requiring that the content be downloaded continuously without interruption in order to provide enjoyable user experience. In some cases, the video and/or the audio are played "live" on a user's device while being downloaded while in other cases, the download content may be first stored in the memory of the user's device for later playing. Whichever may be the case, the content should be downloaded without suffering any substantial interruptions so as to not affect user experience.

Most Internet traffic today includes the use of TCP (transmission control protocol) to transport the streaming content from a server to a client (the user's device) over a communications network. The longer the streaming content is downloaded (e.g. long movies), the greater a probability that the TCP traffic may be interrupted by server failure or migration (i.e., a change in the server's physical or network address).

Various migration/recovery solutions to prevent or recover interrupted TCP traffic exist. One solution, such as the IETF TCP Service Migration Protocol (TSMP) draft, utilizes a proxy—an extra server closer to the user client than the streaming server—to provide the streaming content. All the streaming content passes through the proxy regardless of the streaming server functioning properly. Another solution, such as SockMi, requires changes to the user's browser or other client module (e.g. kernel module), or to the server kernel module. A third solution, such as the Migrate Internet Mobility Project, requires a new session-layer library at the user-level that manages session-based network activity and resource allocation for applications.

SUMMARY OF THE PRESENT INVENTION

There is provided, in accordance with an embodiment of the present invention, a network device to mitigate interruptions in content downloading from a content server to a client device in a client-server network, the device including a recovery module (RM) to migrate a data transfer connection from a first server to a second server responsive to detection of an interruption in data transfer from the first server. The migrated data transfer connection may include an instruction associated with an amount of data transferred prior to the interruption in data transfer.

In accordance with an embodiment of the present invention, the RM includes a database for storing information associated with at least a portion of the data transfer connection.

In accordance with an embodiment of the present invention, the information includes any one of a HTTP request header, a HTTP response header, a client IP address, a client port, a server IP address, a server port, and a TCP sequence number.

In accordance with an embodiment of the present invention, the RM includes a traffic analyzer to analyze information associated with at least a portion of the data transfer connection.

In accordance with an embodiment of the present invention, the RM includes a connection monitor to proxy a portion of the data transfer connection to the RM.

In accordance with an embodiment of the present invention, the RM includes a connection monitor to instruct a network controller on the client-server network to alter packet destination information in the data transfer connection.

In accordance with an embodiment of the present invention, the RM includes an offloader interface to interface with a network controller on the client-server network.

In accordance with an embodiment of the present invention, the RM includes a server monitor to evaluate the detection of an interruption in data transfer from the first server.

In accordance with an embodiment of the present invention, the evaluation is based on a measuring a timeout period following detection of the interruption.

In accordance with an embodiment of the present invention, the evaluation is based on measuring a timeout period following polling of the first server.

In accordance with an embodiment of the present invention, the RM includes an offset evaluator to determine the amount of data transferred prior to the interruption in data transfer In accordance with an embodiment of the present invention, the device additionally includes a network controller.

In accordance with an embodiment of the present invention, the network controller is a Fast Path Offloading (FPO) controller.

In accordance with an embodiment of the present invention, the network controller alters a client IP address and port in the migrated data transfer connection to the second server.

In accordance with an embodiment of the present invention, the network controller alters a server IP address and port in the migrated data transfer connection to the second server.

There is provided, in accordance with an embodiment of the present invention, a method of mitigating interruptions in content downloading from a content server to a client device in a client-server network, the method includes detecting an interruption in a data transfer connection from the content server to the client; migrating the data transfer connection to a second server; and including in the data transfer connection information associated with an amount of content downloaded prior to the interruption.

In accordance with an embodiment of the present invention, the method additionally includes altering a client IP address and client port in data transferred from the second server to the client.

In accordance with an embodiment of the present invention, the method additionally includes altering a server IP address and server port in data transferred from the client to the second server.

In accordance with an embodiment of the present invention, the altering includes a proxy replacing a server IP address and port of the first server with the IP address and server of the second server.

In accordance with an embodiment of the present invention, the method additionally includes probing the client to determine the amount of content downloaded prior to the interruption.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
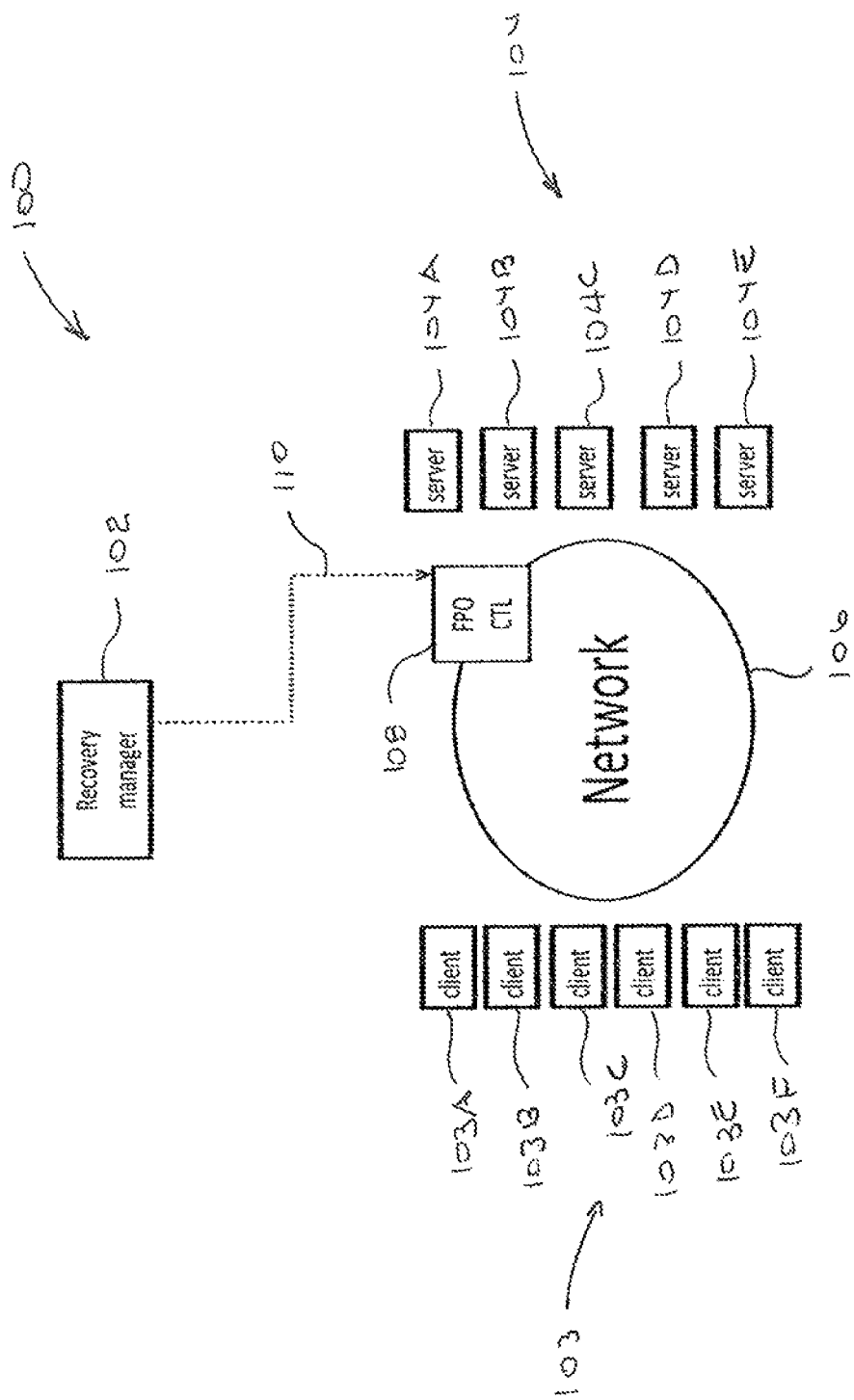
FIG. 1 schematically illustrates a fault tolerant system for downloading content including, according to an embodiment of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Applicants have realized that there are drawbacks to existing TCP migrating/recovery solutions as they either require the existence of a heavy duty proxy through which all traffic has to go, or changes in the server and/or client operating system and/or implementation. Furthermore, there may be additional drawbacks as these solutions may contribute to increased network bandwidth requirements.

Applicants have realized that the drawbacks associated with existing TCP migrating/recovery solutions may be overcome by a fault tolerant mechanism which may be implemented in a network device in a communication network without making any changes to the client and/or the server, and which is wholly transparent to the client and to the server. This fault tolerant mechanism may include a recovery module or "Recovery Manager" capable of monitoring client-server connections on the network and, upon detection of server failure or server migration, continue to serve the client on the same TCP connection while migrating the connection to a different server. The RM should also be capable of serving a number of different data transfer services including audio and video streaming services. These may include HTTP (Hypertext Transfer Protocol), FTP (File Transfer Protocol), Telnet and SMTP (Simple Mail Transfer Protocol), among others. The fault tolerant mechanism may include, as part of the RM, a network control mechanism that may allow the RM to transparently delegate traffic processing to the network. The network control mechanism may include use of Fast Path Offloading (FPO), described in China patent application no. 83824856 (assigned to the common assignees of the present application, which includes.

Description of a Fault Tolerant Content Download System Including a RM

Reference is now made to FIG. 1 which schematically illustrates a fault tolerant system 100 including a RM (102), according to an embodiment of the present invention. Fault tolerant system 100 may include a RM 102; one or more clients 103, for example as shown by clients 103A-103F; a plurality of servers 104, for example as shown by servers 104A-104E, and a network 106 interconnecting the clients and the servers. Fault tolerant system 100 may additionally include a FPO controller 108 in communication with RM 102, the communication link shown by dotted line 110 (RM-FPO link).

Fault tolerant system 100 is configured to allow delivery of fault tolerant download service between servers 104 and clients 103 over network 106. Fault tolerance may be provided by allowing data requested by clients 103 from servers 104 to be served on a same TCP connection regardless of whether or not there is a failure in one of the servers, or if service is migrated from one server to another. By maintaining the same TCP connection, continuity may be provided to clients 103 allowing the data, which may include streaming data (e.g. audio and/or video) among other types of data, to be received by the clients without any substantial interruption which may potentially affect the quality of the received data.

Responsibility for maintaining the same TCP connection between servers 104 and clients 103 lies on RM 102. RM 102 may be a separate module which may be incorporated into an existing or a new client-server system and may be implemented as software, hardware, or a combination of both. RM 102 may operate transparently to both clients 103 and servers 104 and may provide detection of server failures (server breakdown or migration) and responsively, recover TCP connections.

RM 102 may include a database for storing information associated with the traffic between clients 103 and servers 104. The information may include client IP address and port, server IP address and port, initial TCP sequence numbers, TCP options used, HTTP requests and HTTP response headers, among other information which may be used to detect server failure and recover TCP connections.

Functions carried out by RM 102 may include the following:

a. proxying between clients 103 and servers 104 to analyze traffic information in network 106 and forward traffic to the clients following the analyzing;

b. monitoring establishment of new TCP connections including HTTP request and HTTP response headers;

c. instructing FPO controller 108 through RM-FPO link 110 to offload the new TCP connections to network 106;

d. monitoring server conditions and instructing FPO controller 108 to stop offloading when server failure (or migration) is detected; and e. determining a correct offset to be used by a new server 104 based on how much data was transferred by the previous server before it failed (or migrated).

FPO controller 108 may be implemented as software, hardware, or a combination of both, and may provide northbound interface to applications associated with network forwarding and TCP field alteration. As previously mentioned, FPO controller 108 may serve to offload the new TCP connections to network 106 and to cease offloading to the network. Offloading (and ceasing of offloading) may be performed by FPO controller 108 by altering the TCP and IP packet header. Examples of functions which may be performed by FPO controller 108 may include the following:

a. offloading the new TCP connections from RM 102 to network 106 by replacing the destination IP in the packets from RM to client IP, and by replacing the destination port from RM to that of the original client 103;

b. offloading traffic coming from clients 103 back to network 106 by changing the destination IP to that of a new server 104 and destination port to that of the new server; and c. adapting TCP.seq and TCP.ack according to the difference between the failed (or migrated) server and the new server following RM 102 evaluation of an amount of data transmitted before server failure (or migration) occurred.

FPO controller 18 may be implemented over a Software Defined Network (SDN) device which may include a Protocol Oblivious Forwarding (POF) device.

Network 106 may include any wired or wireless network capable of support TCP connections, or a combination of both. Network 106 may include a local area network (LAN), a wide area network (WAN) which may include the Internet, a personal area network (PAN), among other types of networks.

Figure 2:
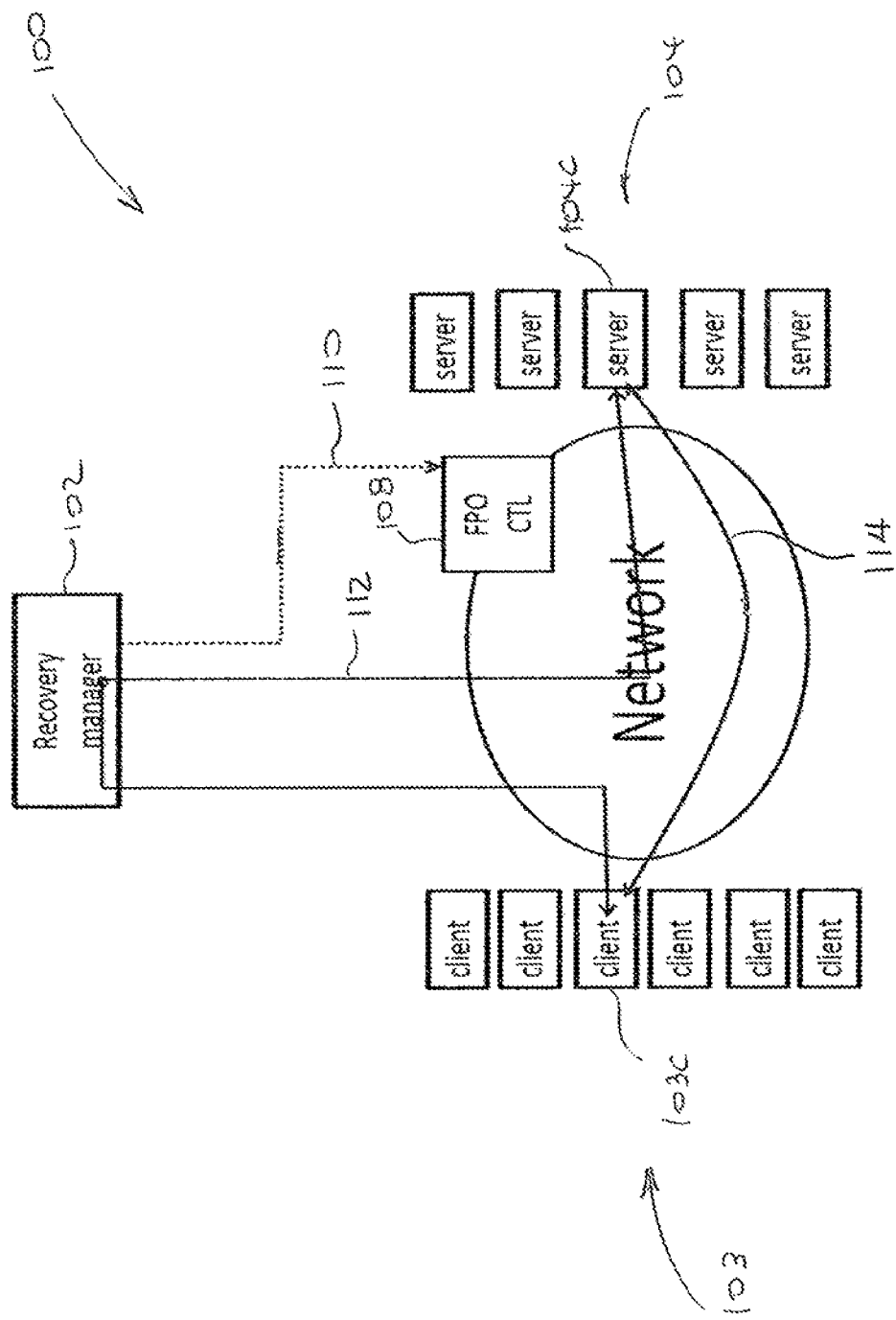
FIG. 2 which schematically illustrates traffic flow in the fault tolerant system in a normal mode of operation, according to an embodiment of the present invention.

Reference is now made to FIG. 2 which schematically illustrates traffic flow in fault tolerant system 100 in a normal mode of operation, according to an embodiment of the present invention. Fault tolerant system 100 is configured such that every new TCP connection between client 103 and server 104 is redirected through RM 102, as indicated by traffic flow arrow 112 which represents initial traffic flow between the client and the server when a new TCP connection is established. Once the information is analyzed, RM 102 may instruct FPO controller 108 through RM-FPO link 110 to offload the connection to network 106. Following offloading to network 106, traffic flow between client 103 and server 104 is direct through the network, as shown by network traffic flow arrow 114 between exemplary client 103C and exemplary server 104C.

While the TCP connection is being established, RM 102 may analyze the information (packet information) in initial traffic flow 112 and following the analysis, may forward the packet to its destination. Traffic flow 112 analysis may be performed by RM 102 on packets travelling in both directions (from client to server and vice versa). RM 102 may monitor the TCP connection and store in the database the HTTP request and HTTP response headers. RM 102 may additionally store in the database information associated with the initially sent packets between client 103 and server 104 and which may include the client IP address and port, the server IP address and port, and the initial TCP sequence numbers and TCP options used, among other relevant TCP connection information.

Figure 3:
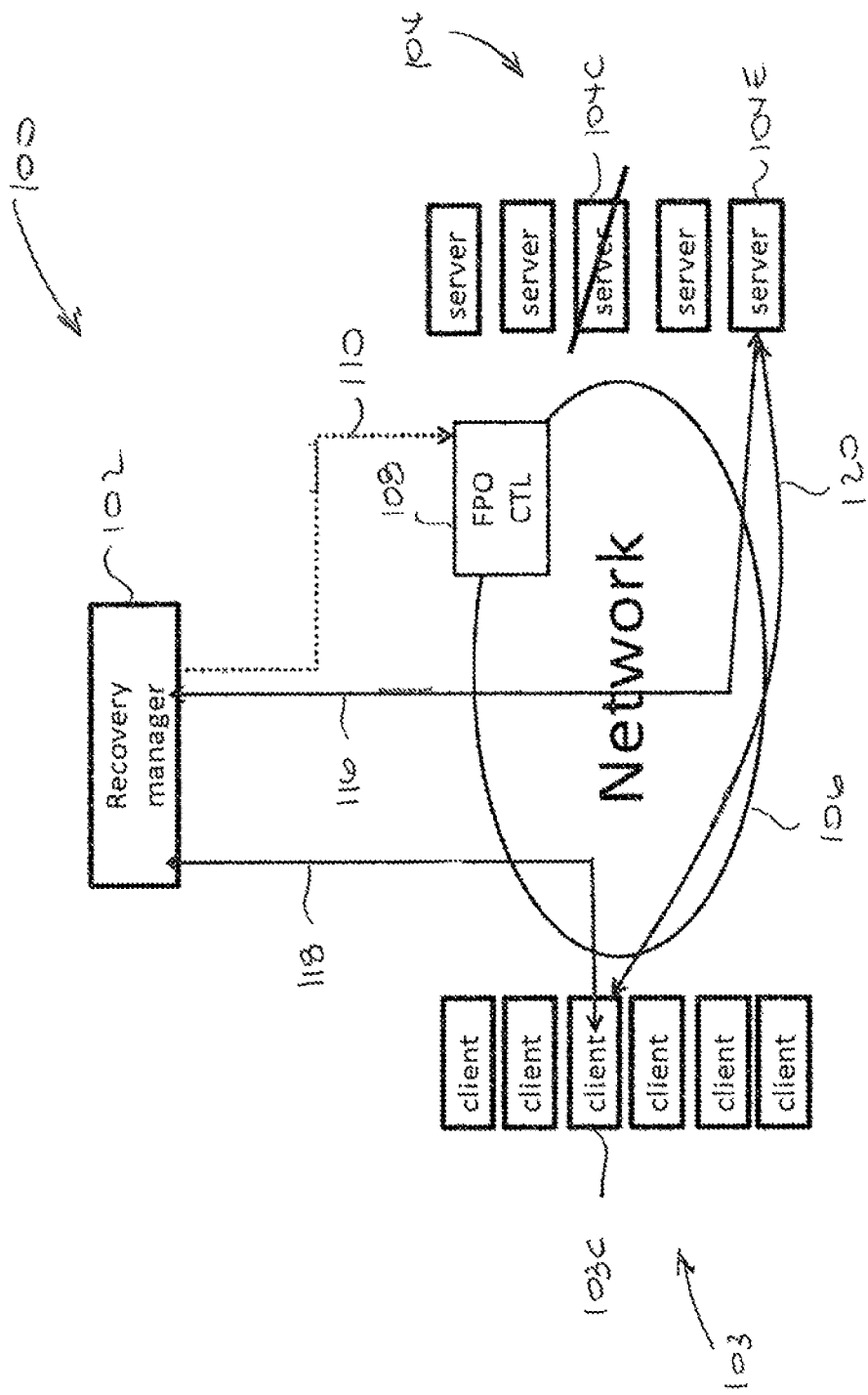
FIG. 3 schematically illustrates traffic flow in the fault tolerant system in a server failure (or migration) mode of operation, according to an embodiment of the present invention.

Reference is now also made to FIG. 3 which schematically illustrates traffic flow in fault tolerant system 100 in a server failure (or migration) mode of operation, according to an embodiment of the present invention. Fault tolerant system 100 may detect server 104 failures or migration using one or more of numerous techniques known in the art. These may include monitoring server connection timeout and/or pinging the server (probing the server by continuously or periodically sending requests (polling) to the server and monitoring the response time).

Applicants have realized that detecting server failure by monitoring timeout conditions may be preferable over other known techniques as it is better supported by FPO over SDN and may provide for increased detection sensitivity potentially resulting in earlier fault detection. In fault tolerant system 100, RM 102 may set a timeout duration t in the offload instructions to FPO controller 108 so that offloading TCP connections to network 106 may be stopped by the FPO controller whenever server 104 has not sent a packet within the timeout duration t. RM 102 may set the time duration t to a relative low duration, for example, 1 or 2 seconds.

As long as packets are received within the time duration t, FPO controller 108 may maintain the connection between client 103 and server 104, as shown in FIG. 2 by network traffic flow arrow 114 connection server 103C and server 104C. Should one or more packets not be sent by server 104 during the duration timeout period t, FPO controller 108 may notify RM 102 of the existence of a server failure (or migration) condition.

Responsive to the notification of failure by FPO controller 108, RM 102 may take any one or any combination of the following actions:

a. Instruct the FPO controller to cease offloading TCP connections to network 106 and to initially reroute all client traffic (by altering the TCP and IP packet header) to RM 102. Initial rerouting of client traffic to RM 102 is exemplarily shown in FIG. 3 by client-RM arrow 118 connecting client 103C with the RM;

b. Attempt to determine how much data has been transferred from the failed server, for example server 104C, to client 103C prior to server failure (or migration). RM 102 may obtain statistics from network 106 or may probe client 103C for example, by sending an out-of-window packet to the client in order to receive a TCP. ack (shown by client-RM arrow 118). RM 102 may then compare the received TCP.ack with server 104C initial sequence number stored in the RM's database to determine an amount of data previously transferred and received by client 103C;

c. Open a new connection to a new server 104E and provide the new server with a correct offset based on the determination of the amount of information transferred to and/or received by client 103C from server 104C. The connection, shown in FIG. 3 by exemplary server-RM arrow 120, may include a new HTTP connection and may include the original HTTP request with the Range HTTP Header including the correct offset. RM 102 may extract from the response from new server 104E the HTTP response header. The HTTP response header may include a status code associated with a partial content, for example, HTTP status code 206, instead of an OK status code, for example, HTTP status code 200.

d. Instruct FPO controller 108 to offload the new connection to network 106, including changing the destination IP address and destination port from RM 102 to client 103C IP address and client port, and server 104E IP address and server port, respectively. FPO controller 108 may additionally be instructed by RM 102 to adapt the TCP.seq and TCP.ack according to the offset between the original and the new connection. Traffic flow may then be direct between client 103C and new server 104E through network 106, as shown by network traffic arrow 120.

Operational Method of a Fault Tolerant Content Download System Including a RM

Figure 4:
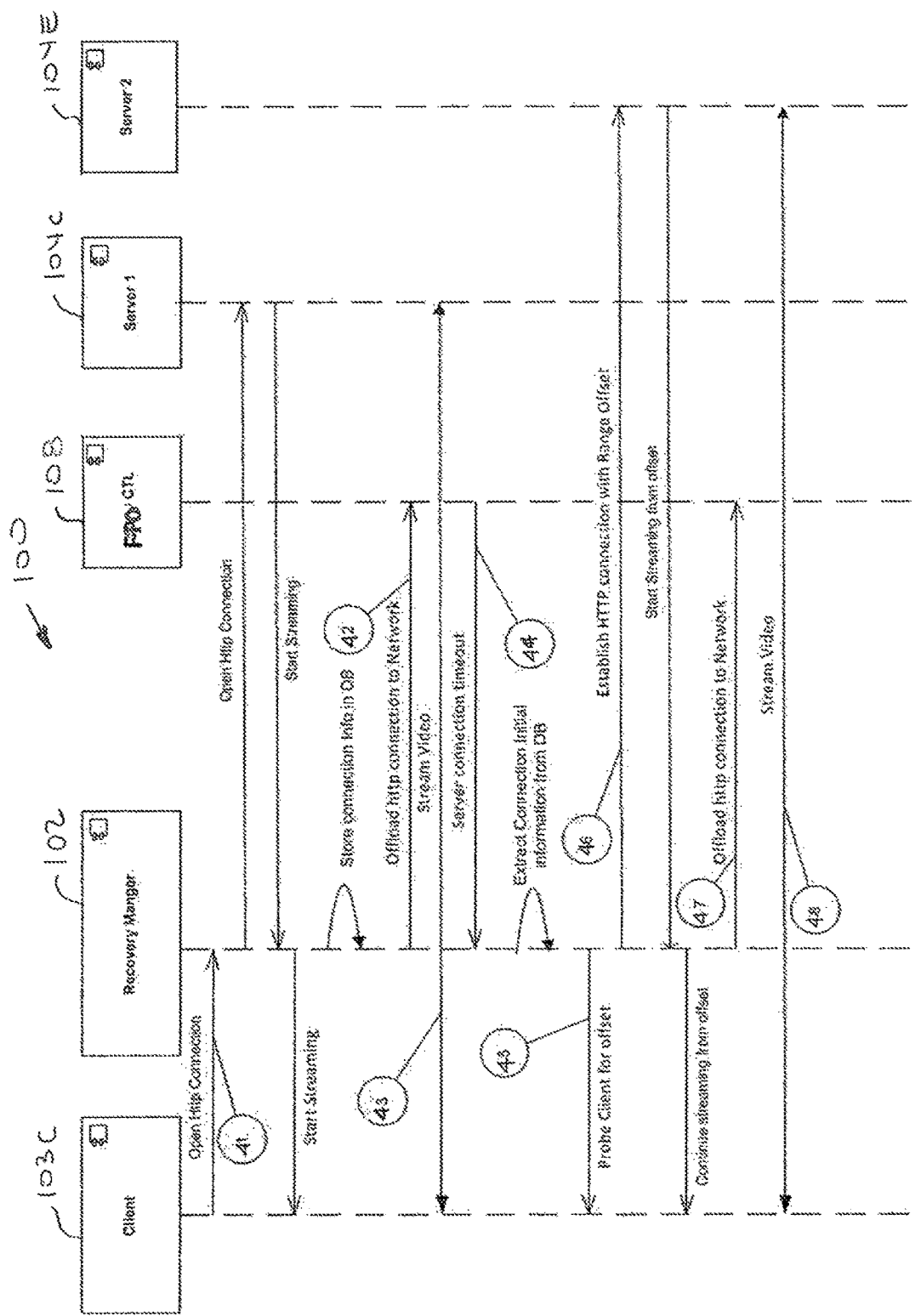
FIG. 4 is an exemplary end-to-end flow chart depicting an operational method of the fault tolerant content download system, according to an embodiment of the present invention.

Reference is now made to FIG. 4 which is an exemplary end-to-end flow chart depicting an operational method of a fault tolerant content download system, according to an embodiment of the present invention. The fault tolerant system may be used to download any one of audio, video, or other streaming data. The operational method of the present invention may be explained herein, for clarity purposes, with reference to fault tolerant system 100 being used to download streaming video, and including client 103C, RM 102, FPO controller 108, and servers 104C and 104E. The skilled person may realize that the operational method of the present invention may be practiced on additional embodiments of the present invention, any may be practiced having more or less steps, or variations in the steps or in the sequence of steps, or any combination thereof.

At step 41, client 103C opens a new HTTP connection with a server 104C. RM 102 proxies the new connection and makes the connection through the RM to server 104C. Initial streaming data from server 104C is proxied through RM 102 to client 103C. RM 102 monitors connection information including HTTP request and HTTP response. The connection information including the HTTP headers are stored in the database in RM 102.

At step 42, RM 102 offloads the HTTP connection to the network through FPO Controller 108.

At step 43, the connection between client 103C and server 104C is direct (not through RM 102). Streaming video is downloaded directly from server 104C to client 103C through the network.

At step 44, FPO controller 108 detects a timeout condition in the network connection with server 104C and notifies RM 102. RM 102 extracts initial connection information stored in its database in order to determine a Range Offset.

At step 45, RM 102 probes client 103C for the Range Offset.

At step 46, RM 102 determines the Range Offset and establishes an HTTP connection with a new server 104E. New server 104E starts streaming from the offset while the connection is proxied by RM 102. RM 102 transfers the initially streamed video to client 103C.

At step 47, RM 102 offloads the connection to the network through FP controller 108.

At step 48, the connection between client 103C and server 104E is direct (not through RM 102). Streaming video is downloaded directly from server 104E to client 103C through the network.

As may be appreciated from the above description, the Recovery Manager including the FPO controller may effectively redirect traffic between a client and a failed server to and from a new server by replacing the new server's IP address and port on every packet from the new server to the client with the failed server IP address and port, and by replacing the old server's IP address and port on every packet from the client with the new server's IP address and port. The result is a fault tolerant system which includes a fault recovery mechanism which is fully transparent to both the clients and the servers.

Figure 5:
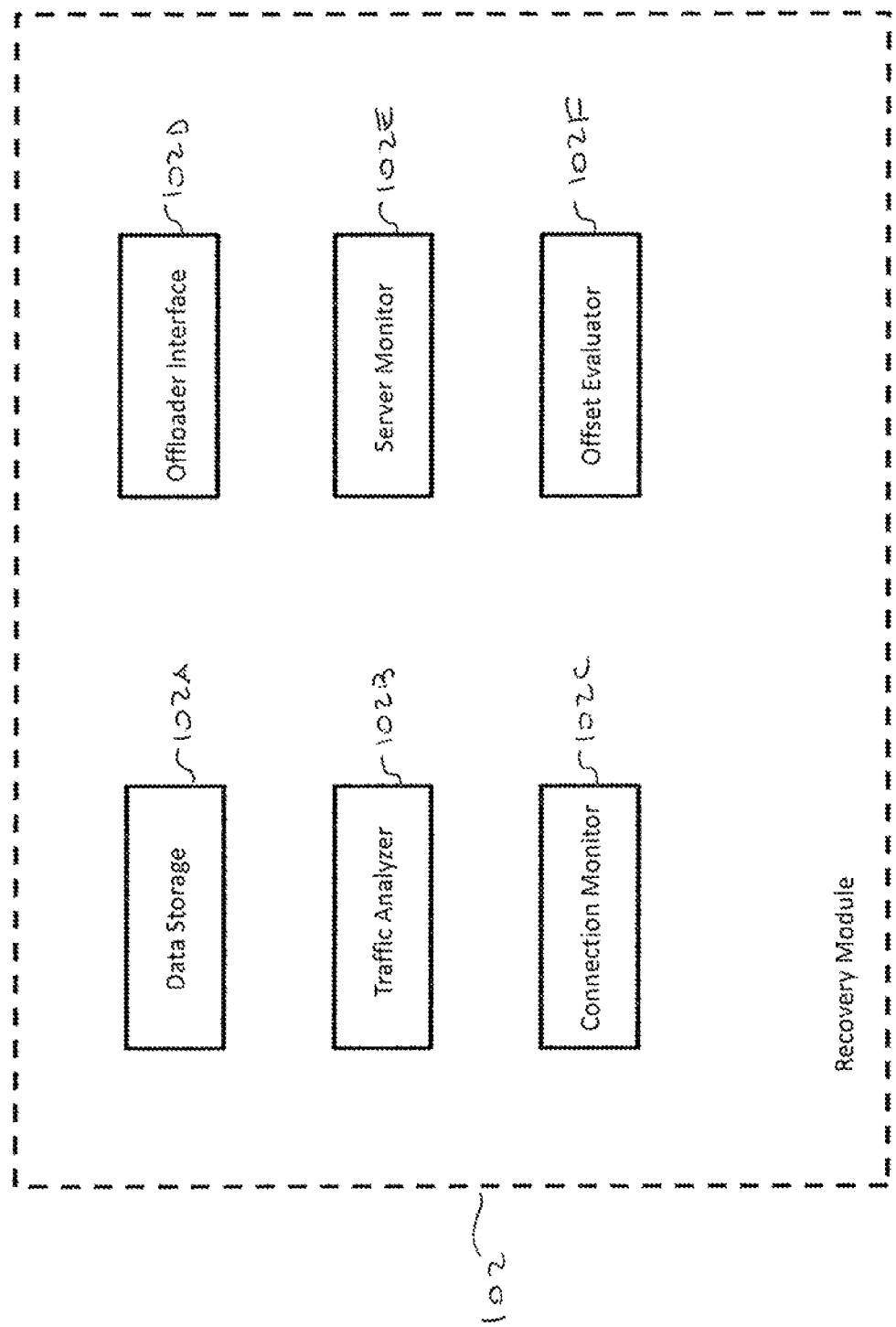
FIG. 5 schematically illustrates a block diagram of an exemplary Recovery Manager used with the fault tolerant system, according to an embodiment of the present invention.

Reference is now made to FIG. 5 which schematically illustrates a block diagram of RM 102, according to an embodiment of the present invention. RM 102 may include a data storage module 102A (database), a traffic analyzer module 102B, a connection monitor module 102C, an offloader interface module 102D, a server monitor module 102E, and an offset evaluator module 102F.

Database 102A may store the information associated with the traffic between clients 103 and servers 104. The stored information may be generated by traffic analyzer 102B and may be derived from the initial traffic flow between clients 103 and servers 104 which is proxied through RM 102. The information may include, as previously described, HTTP request and HTTP response headers, client IP address and port, server address and port, initial TCP sequence numbers, among other relevant TCP connection information.

Connection monitor 102C may monitor the connection between clients 103 and server 104 and may issue commands to offloader interface 102D associated with proxying initial traffic between clients 103 and servers 104 through RM 102 and offloading the traffic to network 106. Connection monitor 102C may additionally provide instructions associated with ceasing offloading the traffic and returning proxy to RM 102. Connection monitor 102C may additionally instruct network controller 108 as to which server to transfer the TCP connection (e.g. server 104E).

Offloader interface 102D may, responsive to commands from connection monitor 102C, may send offload and desist offload instructions to network controller 108. Offloader interface 102D may additionally receive information from network controller 108 regarding network 106 status for evaluation by connection monitor 102C and further processing by the various modules in RM 102.

Server monitor 102E may include means to determine whether communication with a server has been interrupted. A server poller may be included to periodically or continuously poll servers 104 to determine if there has been server failure or migration. A timeout receiver may be included to evaluate an amount of time since a last packet was received in order to determine if the to determine if there has been server failure or migration.

Offset evaluator 102F may evaluate and determine a correct offset to be used by a new server to which the connection is being migrated. The correct offset may be determined based on how much data was transferred prior to server failure or migration, and may include gathering network 106 statistics and/or probing the client, for example by sending a window packet to the client. Offset evaluator 102F may additionally use the initial TCP sequence number and other information stored in database 102A to determine the offset. Offset evaluator 102F may additionally Offset evaluator 102F may transfer the offset information to network controller 108, directly through offloader interface 102D or through connection monitor 102C.

Unless specifically stated otherwise, as apparent from the preceding discussions, it is appreciated that, throughout the specification, discussions utilizing terms such as "processing," "computing," "calculating," "determining," or the like, refer to the action and/or processes of a computer, computing system, or similar electronic computing device that manipulates and/or transforms data represented as physical, such as electronic, quantities within the computing system's registers and/or memories into other data similarly represented as physical quantities within the computing system's memories, registers or other such information storage, transmission or display devices.

Embodiments of the present invention may include apparatus for performing the operations herein. This apparatus may be specially constructed for the desired purposes, or it may comprise a general-purpose computer selectively activated or reconfigured by a computer program stored in the computer. Such a computer program may be stored in a computer readable storage medium, such as, but not limited to, any type of disk, including floppy disks, optical disks, magnetic-optical disks, read-only memories (ROMs), compact disc read-only memories (CD-ROMs), random access memories (RAMs), electrically programmable read-only memories (EPROMs), electrically erasable and programmable read only memories (EEPROMs), magnetic or optical cards, Flash memory, or any other type of media suitable for storing electronic instructions and capable of being coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A network device to mitigate interruptions in content downloading from a content server to a client device in a client-server network, the device comprising:
    a recovery module (RM) to migrate a data transfer connection of the client device from a first server to a second server responsive to detection of an interruption in data transfer from said first server while maintaining a same TCP connection of the client device, said migrated data transfer connection comprising an instruction associated with an amount of data transferred prior to said interruption in data transfer.

2. A network device according to claim 1 wherein said RM comprises a database for storing information associated with at least a portion of said data transfer connection.

3. A network device according to claim 2 wherein said information comprises any one of a HTTP request header, a HTTP response header, a client IP address, a client port, a server IP address, a server port, and a TCP sequence number.

4. A network device according to claim 1 wherein said RM comprises a traffic analyzer to analyze information associated with at least a portion of said data transfer connection.

5. A network device according to claim 1 wherein said RM comprises a connection monitor to proxy a portion of said data transfer connection to the RM.

6. A network device according to claim 1 wherein said RM comprises a connection monitor to instruct a network controller on the client-server network to alter packet destination information in said data transfer connection.

7. A network device according to claim 1 wherein said RM comprises an offloader interface to interface with a network controller on the client-server network.

8. A network device according to claim 1 wherein said RM comprises a server monitor to evaluate said detection of an interruption in data transfer from said first server.

9. A network device according to claim 8 wherein said evaluation is based on a measuring a timeout period following detection of said interruption.

10. A network device according to claim 8 wherein said evaluation is based on measuring a timeout period following polling of said first server.

11. A network device according to claim 1 wherein said RM comprises an offset evaluator to determine said amount of data transferred prior to said interruption in data transfer.

12. A network device according to claim 1 further comprising a network controller.

13. A network device according to claim 12 wherein said network controller is a Fast Path Offloading (FPO) controller.

14. A network device according to claim 12 wherein said network controller alters a client IP address and port in said migrated data transfer connection to said second server.

15. A network device according to claim 12 wherein said network controller alters a server IP address and port in said migrated data transfer connection to said second server.

16. A method of mitigating interruptions in content downloading from a content server to a client device in a client-server network, the method comprising:
    detecting an interruption in a data transfer connection from the content server to the client;
    migrating said data transfer connection of the client device to a second server while maintaining a same TCP connection of the client device; and
    including in said data transfer connection information associated with an amount of content downloaded prior to the interruption.

17. The method according to claim 16 further comprising altering a client IP address and client port in data transferred from said second server to the client.

18. The method according to claim 16 further comprising altering a server IP address and server port in data transferred from the client to said second server.

19. The method according to claim 18 wherein said altering comprises a proxy replacing a server IP address and port of the first server with said IP address and server of said second server.

20. The method according to claim 16 further comprising probing the client to determine said amount of content downloaded prior to the interruption.

* * * * *